April 29, 1952     G. T. MUEHLENKAMP     2,594,973
ELECTRIC FURNACE AND LEAD ELECTRODE
Filed Sept. 9, 1949
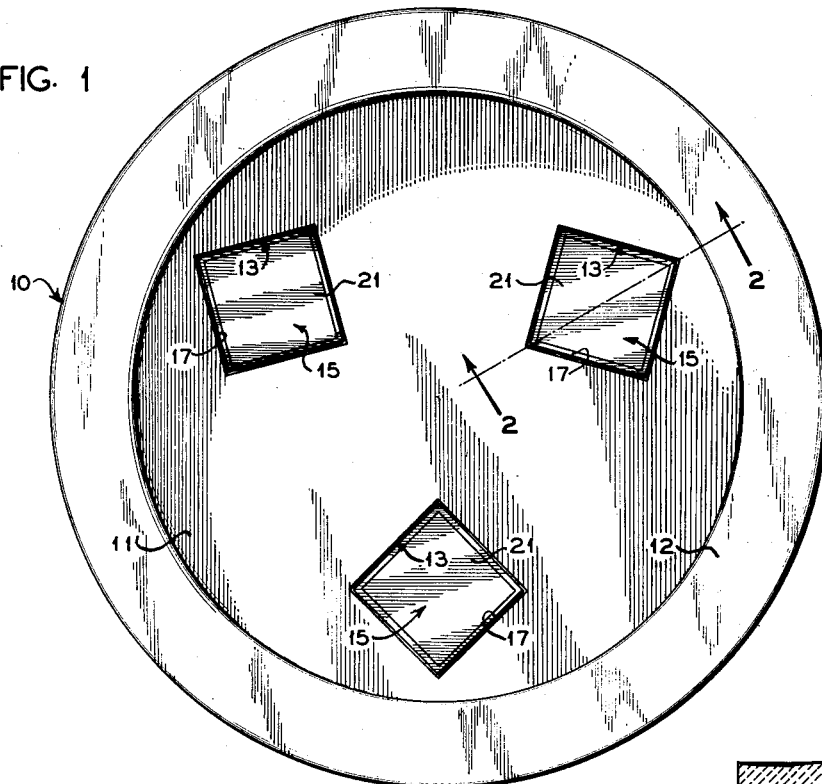
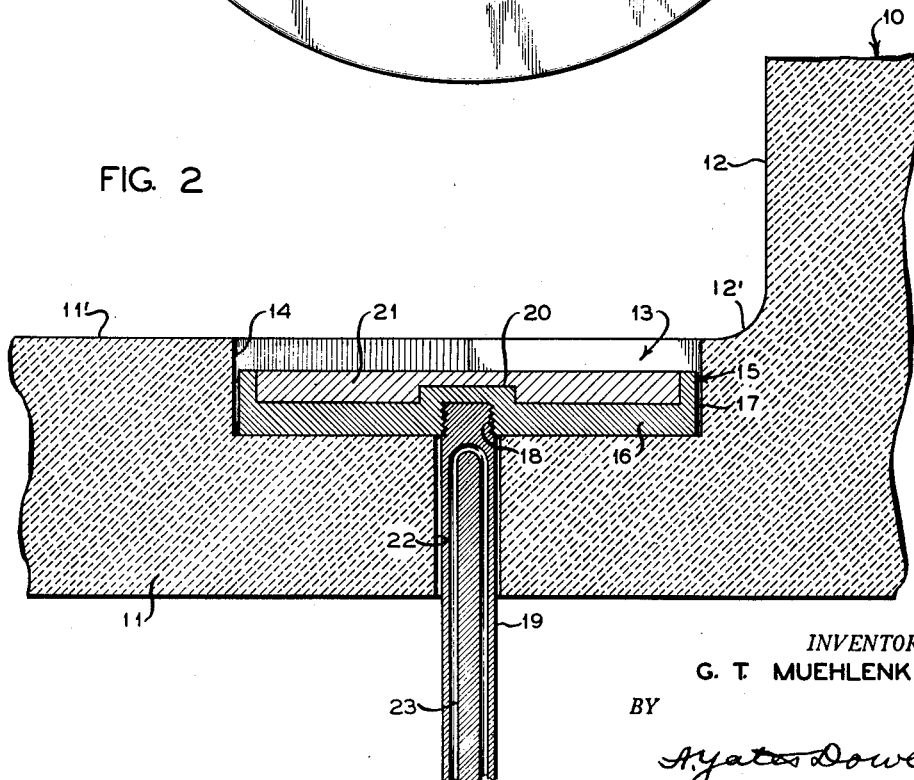
INVENTOR.
G. T. MUEHLENKAMP
BY
A. Yates Dowell
ATTORNEY Patented Apr. 29, 1952

2,594,973

UNITED STATES PATENT OFFICE 2,594,973

ELECTRIC FURNACE AND LEAD ELECTRODE

George T. Muehlenkamp, Columbus, Ohio, assignor, by mesne assignments, to Fostoria Glass Company, Moundsville, W. Va., a corporation of West Virginia Application September 9, 1949, Serial No. 114,733

3 Claims. (Cl. 13—6)

This invention relates to heating and more particularly to an electric furnace adapted for the melting and fining of glass and to the specific construction of the electrodes used therewith.

The selection of an electrode material for a glass furnace of the type in which the charge completes the circuit between the electrodes is of particular importance in the glass making industry. In the manufacture of glassware of high quality, including crystal and the like, it is important that the glass be free of impurities and be clear and devoid of color.

In glass furnaces of this type in which a lead glass is to be produced it is particularly desirable that the electrodes be of a material at least as noble or as high in the electrochemical series as is lead. Otherwise, the material of the electrode may displace lead from the liquid batch or solution of the furnace, resulting in a decrease in the quality of the product and the necessity for providing means for removing the lead which collects on the floor of the furnace.

The advantages which result from the use of lead as an electrode material have been recognized heretofore but difficulty has been experienced in providing a suitable container for the lead which under usual operating conditions is in the molten state and has a high degree of fluidity.

Heretofore, one means of attempting to hold the lead in its molten state has been to provide a ceramic liner or jacket as shown in the patent to Ferguson, No. 2,007,755.

Another means for using lead as an electrode is to employ a relatively large block of lead together with means for cooling the same so that the outer and lower portions will remain in the solid state while the upper central portion is liquefied, as disclosed in Ferguson, No. 2,014,615.

The use, heretofore, of a lead electrode has been accompanied by disadvantages which relate chiefly to the inadequacy of the means for containing the lead, or the disadvantages which accompany the use of the means. For example, at temperatures in the neighborhood of 2600–2700° F. the lead is in a highly fluid state and can pass through cracks, fissions, and the like which are present in ceramics. This may result in such deficiencies as shorting of the electrical circuit, the loss of lead, and the like. This property of the lead's being in a highly fluid state at the temperatures above mentioned makes the use of ceramics particularly unsuitable for temperatures approaching 3,000° F. which are frequently necessary in a furnace of this type.

The use of a block of lead with means for cooling the lower part is not a satisfactory solution because of the relatively large amount of cooling that is required to keep the lower part of the lead block in the solid state. This can be readily understood from the fact that the melting point of lead is approximately 618° F. or 325.6° C.

Accordingly, it is an object of the present invention to provide an electrode particularly adapted for use in a resistance charge type glass furnace.

Another object of the invention is the provision of a lead electrode for a resistance charge type glass furnace in which the container for the lead is so constructed and of such material that the disadvantages referred to above are obviated.

A further object of the invention is the provision of a glass furnace of the resistance charge type in which lead electrodes are provided having means for containing the same in the molten state and which are particularly adapted for holding the lead in the state of high fluidity occurring at elevated temperatures.

A further object of the invention is to provide an electric furnace for treating glass in which the inner wall of the furnace presents a substantially continuous uninterrupted surface in order to maintain the glass in a substantially homogeneous mass having substantially the same temperature throughout.

These and other advantages of the present invention will become apparent from the following description taken in conjunction with the attached drawings, wherein:

Fig. 1 is a plan view of a furnace constructed in accordance with the present invention; and Fig. 2, an enlarged section on the line 2—2 of Fig. 1.

With continued reference to the drawing there is illustrated therein a tank 10 having a bottom 11 and a side wall 12. The tank is preferably cylindrical in cross-section with the inner bottom surface 11' and the inner surface of the side wall 12 being joined by a smooth fillet or curved surface 12'. Such a configuration of the inner wall of the tank insures that heat conduction through the mass of molten glass will be substantially uniform whereby cold and hot areas are prevented and also this configuration serves to provide for a uniform movement or circulation of the molten glass during heat treatment thereof, whereby complete intermingling of the constituents is maintained and the mass is substantially homogeneous at all times.

Located within the tank are a plurality of composite electrodes 13 spaced 120 degrees apart about the axis of the tank and equidistant from its center. The electrodes shown are square in plan and have a pair of their diagonal corners lying along a radius of the cylinder.

Each of the electrodes is positioned in a well 14 which is of substantially the same shape in plan as the electrodes and of a size to permit a small amount of clearance at the sides between the outer perimeter of the electrode and the inside wall of the well 14 to compensate for differences in the coefficients of expansion of the materials forming the furnace walls and the electrodes. The well is also constructed of a depth greater than the height of the electrode in order that it will be below the inner surface 11' of the tank.

The composite electrode, itself, consists of a container or cup member 15 which is preferably of molybdenum. The cup includes a bottom 16, and side walls 17. The central portion of the bottom is tapped at 18 to receive an electrode support or conductor 19, and the central portion of the bottom is provided with a raised portion or hub 20 to provide the necessary thickness for the bottom adjacent the tapped recess.

Positioned within the confines of the cup is a suitable body or quantity of lead 21 which during the normal operation of the furnace is in the molten state.

A bore 22 is provided in the bottom 11 of tank 10 and in this bore is disposed the conductor 19 whereby an electrical path from the exterior of the tank to the electrode 15 is provided. The internal diameter of the bore 22 is slightly larger than the external diameter of the conductor 19 in order to compensate for differences in coefficients of expansion between the material of the conductor and the furnace, and likewise to provide an insulating space in order to assist in maintaining the conductor 19 in a relatively cold condition. In certain instances it may prove desirable to provide additional means for cooling the conductor 19 and there is therefore illustrated axially disposed passages 23 therein through which a cooling fluid may be conducted in heat exchange relation with the conductor 19.

The invention is not limited to the specific means by which the molybdenum cup 15 is produced, the invention contemplating a cup made of riveted or welded sections, and which may have an inside spun cup of the same material. The invention also contemplates the use of an integral forged or cast cup of molybdenum.

Other materials may be used for the container in place of molybdenum if discoloration of the product is permissible, for example, a high heat resistant steel. The invention also contemplates the use of a steel cup which is coated with molybdenum or a ceramic in order to protect the glass batch from discoloration. Instead of employing a coating over the steel or other suitable metal, the cup may be maintained at a temperature sufficiently low to prevent its being taken into the glass solution.

When using the construction described above and shown in the accompanying drawings, a molten lead composite electrode may be used without the necessity for supplying an excessive amount of cooling and by means of which high quality glass may be produced and which does not suffer from leakage through the container provided.

In addition to its advantages referred to above, the use of molybdenum as the molten lead container is particularly advantageous because of its availability and the ease with which it may be fabricated. Furthermore, it is almost as high in the electrochemical series as lead and when used in the manner shown and described does not injuriously affect the quality of the glass.

Furthermore, inasmuch as lead is not precipitated from the solution in the tank the use of electrodes of this type eliminates the necessity for means for draining molten lead from the tank.

It will be obvious to those skilled in the art that various changes may be made in the invention without departing from the spirit and scope thereof, and therefore, the invention is not limited by that which is described or shown on the accompanying drawings, but only as indicated in the appended claims.

What is claimed is:

1. Electric furnace construction for use in the melting and in the manufacture of glass comprising in combination a tank having an inner circular wall presenting a substantially continuous uninterrupted surface, whereby the glass is maintained substantially homogeneous and at substantially the same temperature throughout, said tank being composed of heat resistant material capable of withstanding a temperature of at least 3000° F., said tank having in its bottom a plurality of wells substantially square in cross-section, a bore in the bottom of each well having communication with the exterior of said tank, said wells being substantially equally spaced from the center of the tank and disposed at regular intervals about the axis thereof, with two of the diagonal corners of each well disposed along a radius of said tank, a composite electrode in each well having its entire upper surface disposed below the upper surface of the bottom of said tank, said electrode comprising a relatively large shallow molybdenum container, a body of lead substantially filling said container, a conductor disposed in said bore and having a threaded connection with said container adjacent its central portion, said conductor being smaller in cross-section than said bore thus providing an insulating space therebetween, and an axial passage in said conductor for conducting a cooling medium in heat exchange relation therewith.

2. Electric furnace construction for use in the melting and in the manufacture of glass comprising in combination a tank having an inner circular wall presenting a substantially continuous uninterrupted surface whereby the glass is maintained substantially homogeneous and at substantially the same temperature throughout, said tank being composed of heat resistant material, said tank having in its bottom a plurality of wells substantially square in cross-section, a bore in the bottom of each well and communicating with the exterior of said tank, said wells being substantially equally spaced from the center of the tank and disposed at regular intervals about the axis thereof with two of the diagonal corners of each well disposed along a radius of said tank, a composite electrode in each well having its entire upper surface disposed below the upper surface of the bottom of said tank, said electrode comprising a relatively large shallow molybdenum container, a body of lead substantially filling said container, a conductor disposed in said bore and having a threaded connection with said container adjacent its central portion, said conductor being smaller in cross-section than said bore thus providing an insulating space therebetween, and an axial passage in said conductor for conducting a cooling medium in heat exchange relation therewith.

3. Electric furnace construction for use in the melting and in the manufacture of glass comprising in combination a tank having an inner wall presenting a substantially continuous uninterrupted surface whereby the glass is maintained substantially homogeneous and at substantially the same temperature throughout, said tank being composed of heat resistant material, said tank having in its bottom a plurality of wells, a bore in the bottom of each well having communication with the exterior of said tank and disposed at regular intervals about the axis thereof, a composite electrode in each well having its entire upper surface disposed below the upper surface of the bottom of said tank, said electrode comprising a relatively large shallow molybdenum container, a body of lead substantially filling said container, a conductor disposed in said bore and having a threaded connection with said container adjacent its central portion, said conductor being smaller in cross-section than said bore thus providing an insulating space therebetween, and an axial passage in said conductor for conducting a cooling medium in heat exchange relation therewith.

GEORGE T. MUEHLENKAMP.

REFERENCES CITED

The following references are of record in the file of this patent:

UNITED STATES PATENTS

| Number | Name | Date |
| --- | --- | --- |
| 1,542,716 | Payne | June 16, 1925 |
| 1,878,591 | McIntosh | Sept. 20, 1932 |
| 2,000,278 | Ferguson | May 7, 1935 |
| 2,007,755 | Ferguson | July 9, 1935 |
| 2,014,615 | Ferguson | Sept. 17, 1935 |
| 2,244,267 | Slayter et al. | June 3, 1947 |
| 2,512,206 | Holden | June 20, 1950 |

FOREIGN PATENTS

| Number | Country | Date |
| --- | --- | --- |
| 14,858 | Great Britain | of 1909 |